May 29, 1934.   J. W. CHADWICK   1,960,866
SYSTEM FOR HEATING PIPE LINES
Filed Dec. 2, 1930   2 Sheets-Sheet 2
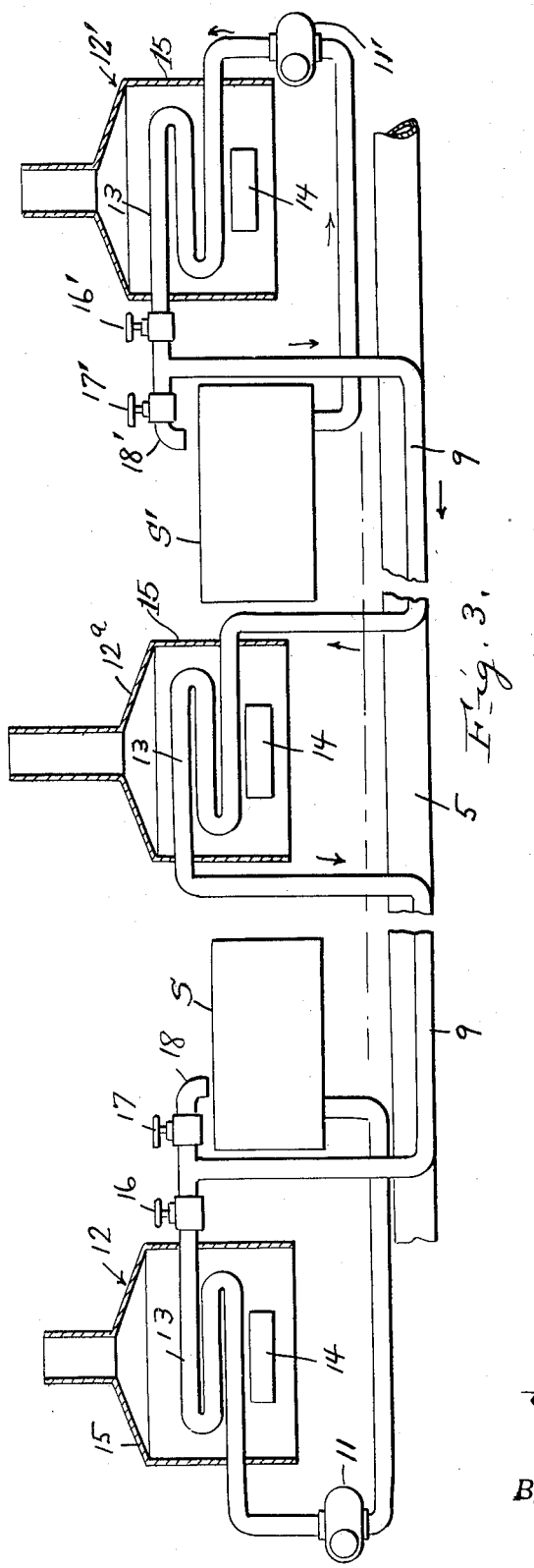
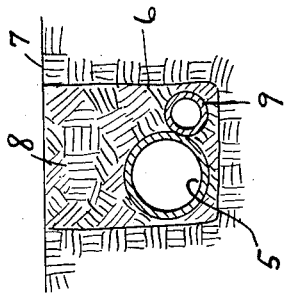
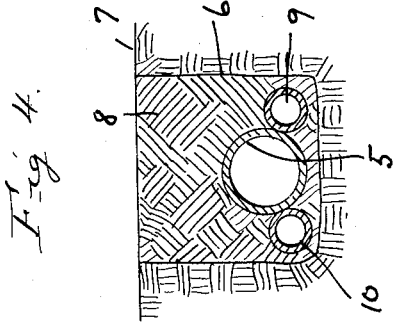
Inventor
J. W. Chadwick
By Clarence A. O'Brien
Attorney Patented May 29, 1934

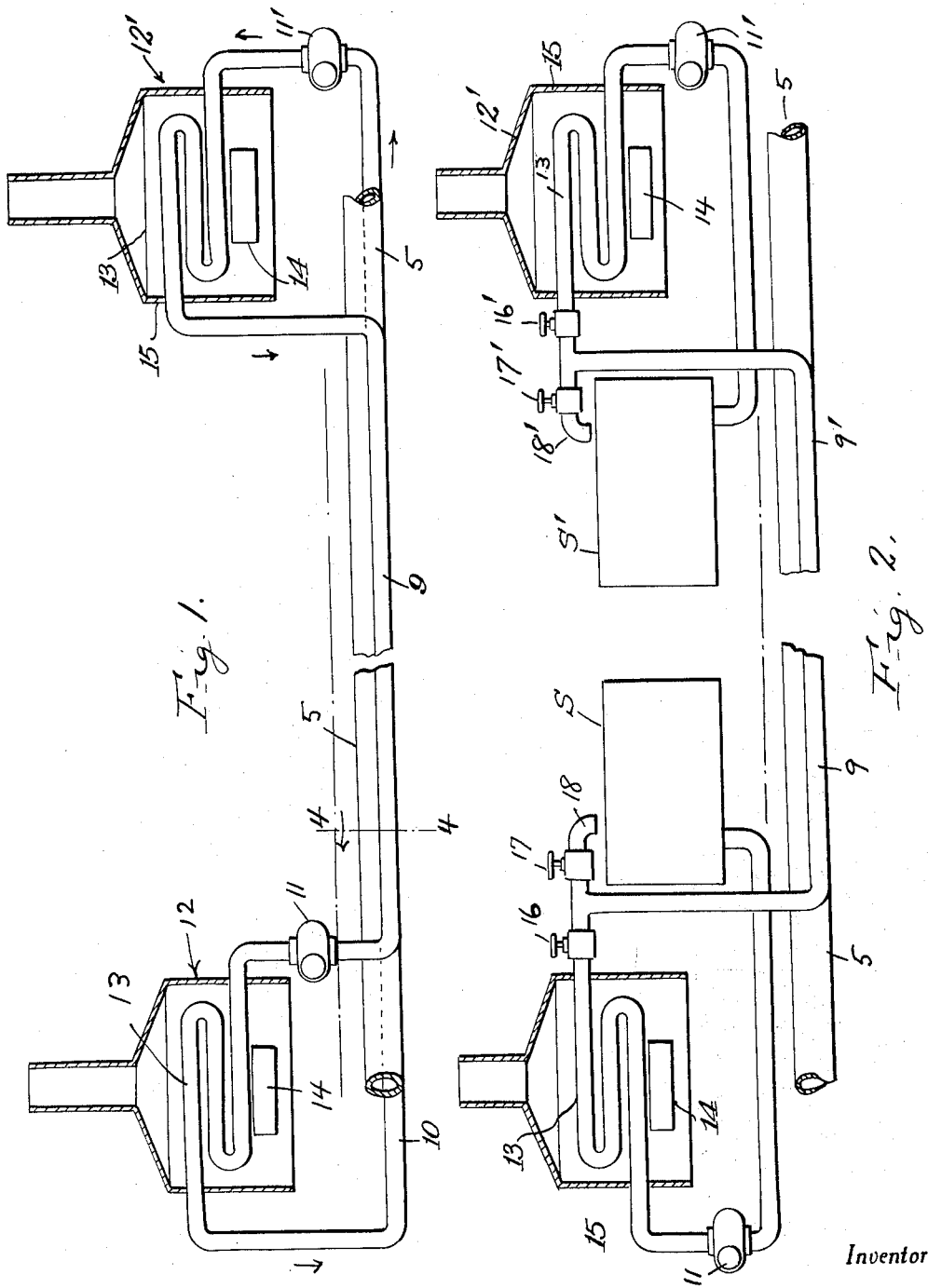

1,960,866

UNITED STATES PATENT OFFICE 1,960,866

SYSTEM FOR HEATING PIPE LINES

John W. Chadwick, Casper, Wyo.

Application December 2, 1930, Serial No. 499,605

1 Claim. (Cl. 137—78)

This invention relates generally to a system for heating pipe lines used in the transmission of viscous fluids, and particularly to a new and novel arrangement and disposition of parts which results in a system of this kind which is more efficient and is cheaper to manufacture, install and maintain.

One of the objects of the invention is to provide a highly efficient system of the type described which is capable of satisfactory employment in the transmission of fluids of high viscosity such as certain types of Mexican, California, Rocky Mountain, and Canadian petroleum oils, whereby the transmission of the same through pipe lines is made practical and comparatively inexpensive in spite of their high viscosity and low temperatures sometimes obtaining in these and other regions.

It is also an object of this invention to provide a system of the type described which will not become inoperative due to an increase in the viscosity of the fluids during the suspension of operation or the suspension of the transmission of the fluids which usually results from cold in the known systems of record in the art.

It is also an object of this invention to provide a system which will be efficient and satisfactory in cold weather and permit the free and advantageous transmission of viscous fluids at any and all times during the operation of the system, the invention contemplating the provision of a proper and adequate insulation structure which enables the efficient operation of my heating system.

These and other objects of the invention, its nature, and its composition and arrangement and combination of parts will be readily understood by any one acquainted with the art to which this invention relates upon consulting the following description of the drawings, in which:—

Figure 1 is a side elevational view of one embodiment of my invention employing two or more heating lines permitting a continuous circuit of the heating element in the lines.

Figure 2 is a side elevational view of another embodiment of my invention which employs a single heating line in which the course of the heating vehicle is unidirectional but reversible.

Figure 3 is a side elevational view of an embodiment of my invention similar to that shown in Figure 2, wherein is incorporated an intermediate heater.

Figure 4 is an illustration in transverse section showing a manner of disposing the heating lines in accordance with the arrangement shown in Figure 1.

Figure 5 is a view similar to Figure 4 disclosing an arrangement of the heating lines in accordance with the embodiment of the invention shown in Figures 2 and 3.

Referring in detail to the drawings, the numeral 5 designates a pipe line for transmission of viscous fluids which is buried in a ditch 6 at some distance from the level of the ground 7. Suitable insulating material 8 of any desired type, which may consist of the earth removed in forming the ditch, covers completely the pipe line 5 so that transmission of cold thereto or escape of heat therefrom is limited as much as possible. In direct contact with the sides of the pipe line 5 are disposed the heating lines or pipes 9 and 10, respectively, which are adapted to contain a fluid of comparatively low viscosity such as a light oil or kerosene which is circulated therethrough by force pumps 11 11' or other suitable means after having been heated in any suitable device such as a coil heater generally designated at 12 having the coil 13, the burner 14 and the hood 15.

In the embodiment shown in Figure 1 there are provided heaters 12, 12' either end of the section of pipe line 5 to be heated and the kerosene or the like is circulated through the coils 13 over the burners 14 and through the pipe 9 to the pumps 11 11' in the direction of the arrows. The right hand pump 11' as shown in Figure 1 forces said fluid through the right hand heater 12' from which the fluid passes in the direction of the arrows through the pipe 10 and back to the left hand heating unit 12, thus accomplishing a complete circulation in one direction which is reversible when desired. Construction or operation considerations may occasionally dictate the elimination of one of the heaters or pumps, so that where the pipe line section is short, the system could be operated by a single heater and pump.

An arrangement which is less expensive to install and operate than the one just described is illustrated in Figures 2 and 3. Referring to Figure 3, heating units 12 are provided at either end of the pipe line section. Reservoirs or storage tanks S, S' are provided to contain the supply of heating fluid. When the circulation of the heating fluid is toward the left, it is drawn from the tank S' by the pump 11' and forced through the heater coil 13 of the heater 12' to the outlet end of which is connected the end of the heating line portion 9'. When the circulation is toward the left, the valve 16' must be open to establish communication of the said heater coil 13 and heating line portion 9', and the valve 17' must be closed to prevent flow of the heated heating fluid through the discharge 18' into the tank S'. However, when the circulation of the heating fluid in the heating line 9 is toward the right, the valve 16' must be closed and the valve 17' open so that the heating fluid will flow from the heating line portion 9' into the tank S'. In similar manner, the circulation being toward the left, the valve 16 of the left hand unit must be closed and the valve 17 open to permit flow of the heating fluid into the tank S.

It is to be observed that with the above described arrangement circulation of the heating fluid in the heating line in one direction at a time is provided for and that changing the direction of circulation of the heating fluid entails some delay and interruption of the continuity of the heating of the pipe line, whereas in the form of the invention shown in Figure 1, a continuous circulation in opposite directions on either side of the pipe line is provided for, the heaters at either end of the pipe line being arranged to be operative at the same time, so that there is no periodic drop in the heating of the pipe line.

In Figure 3 is shown, besides the structure described immediately above, an auxiliary heater 12a and the manner of its incorporation in the heating line 9 intermediate the terminal heaters 12, 12'. Sometimes the addition of one or more auxiliary heaters 12a is required by conditions such as extremely cold weather and extremely high viscosity of the fluid being transmitted. In the single pipe heating system it may be of advantage to provide for the interpolation of a plurality of auxiliary heaters of the type 12a, the manner of installation of which is shown in Figure 3. The adjacent ends of the heating line portions 9, 9' are connected to the auxiliary heater coil 13a heated by the heater 14a within the hood, whereby the heating fluid is reheated after travelling in either direction from the terminal heaters.

What is claimed is:—

In a pipe line heating system, heating fluid containing conduit means extending along the pipe line in heating relation thereto, heater means at each end of the portion of the pipe line to be heated only one of which is to be in operation at a time, each of the heater means comprising a heating coil to which a portion of the conduit means is connected, a heating fluid reservoir, a normally closed valved outlet on a portion of the conduit emptying into the reservoir, a pump having its intake side connected to the reservoir and its outlet side connected to the heating coil for drawing the fluid from the reservoir and forcing it through the heating coil and through the conduit in a direction toward the other inactive heater means, normally open valve means between the heating coil and the conduit, said valved outlet being adapted to be opened and said valve means closed when the other heater means is operated and heating fluid is forced in the opposite direction, and auxiliary heater means interpolated in the conduit means between the said heater means, the auxiliary heater means comprising heating coil means connected to the conduit means, the heating coil means being arranged to pass the heating fluid therethrough in either direction.

JOHN W. CHADWICK.